US006618666B2

(12) United States Patent
Amano et al.

(10) Patent No.: US 6,618,666 B2
(45) Date of Patent: Sep. 9, 2003

(54) ELECTRONIC CONTROL UNIT AND METHOD FOR MEASURING ENGINE SOAK TIME

(75) Inventors: Isao Amano, Nishio (JP); Atsushi Sugimura, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/874,209

(22) Filed: Jun. 6, 2001

(65) Prior Publication Data

US 2002/0013655 A1 Jan. 31, 2002

(30) Foreign Application Priority Data

Jun. 29, 2000 (JP) ....................................... 2000-195867

(51) Int. Cl.[7] .................................................. G06F 1/14

(52) U.S. Cl. ....................... 701/113; 701/114; 701/102; 701/29

(58) Field of Search ................................ 701/113, 114, 701/102, 115, 29, 35, 30

(56) References Cited

U.S. PATENT DOCUMENTS 5,079,727 A * 1/1992 Yasue et al. .................. 702/84
5,995,886 A * 11/1999 Tanaka et al. ................ 701/29
6,169,942 B1 1/2001 Miller et al.

FOREIGN PATENT DOCUMENTS

JP 4-292545 10/1992
JP 9-160602 * 6/1997 .......... F02D/45/00

* cited by examiner

*Primary Examiner*—Hieu T. Vo
(74) *Attorney, Agent, or Firm*—Nixon & Vanderhye P.C.

(57) ABSTRACT

In an ECU for vehicles, a microcomputer operates with a main power from a battery, and a clock IC operates with sub power from the battery and measures time continuously irrespective of whether the microcomputer is operating. The microcomputer stores time data of the clock IC just before the supply of main power is turned off, and calculates a soak time or engine stop period from the stored time data and a current time data of the clock IC only after the supply of main power is turned on again and engine cranking is completed. This soak time represents the engine stop period. Operation of a cooling water temperature sensor or the like is checked by using the sensor output in relation to the calculated soak time.

5 Claims, 4 Drawing Sheets

ELECTRONIC CONTROL UNIT AND METHOD FOR MEASURING ENGINE SOAK TIME

CROSS REFERENCE TO RELATED APPLICATION

This application is based on and incorporates herein by reference Japanese Patent Application No. 2000-195867 filed Jun. 29, 2000.

BACKGROUND OF THE INVENTION

This invention relates to a vehicle electronic control unit and method, and particularly to a vehicle electronic control unit and method for measuring a soak time of an engine by using a timing part such as a clock IC (integrated circuit) which measures time continuously irrespective of whether a microcomputer is operating or stopped.

Electronic control units (ECUs) for vehicles use a built-in clock IC as a timing part or an external clock to measure elapsed time and use data from the clock IC to calculate a time period in which the ECU power supply has been turned off and a microcomputer held inoperative. This elapsed time is an engine stoppage time (soak time Ts).

In one proposal, the microcomputer reads in time measured by the clock IC at every predetermined interval (circle mark in FIG. 5) and stores this time data in a memory such as a standby RAM (SMAM) by updating. Thus, when an ignition (IG) switch is turned off, that is, the microcomputer is turned inoperative (time t11), the time data immediately before the turning off is held stored. When the IG switch is turned on again later (t12) to re-start the microcomputer operation, the microcomputer calculates the soak time Ts from the difference between the time data stored in the memory and the current time measured by the clock IC presently.

However, a power supply voltage of a battery falls temporarily when the engine is cranked by a starter. Thus, a main power supplied to the microcomputer falls below a predetermined voltage VMC required for the microcomputer to operate, and the microcomputer tends to be reset from time t13 to time t14. As a result, when the microcomputer starts operating after being reset, the soak time Ts which has already been calculated immediately after the turning on of the IG switch is calculated again. This recalculated soak time Ts becomes very short. This problem is phenomenal in winter when the battery power is lowered due to low ambient temperature.

SUMMARY OF THE INVENTION

It is therefore an object of the invention to provide an electronic control unit and method which can measure an engine soak time accurately.

According to the present invention, an electronic control unit for a vehicle has a timing part continuously supplied with an electric power to measure time, a control part operable to carry out a predetermined operation when the electric power is supplied, and a memory which stores the measured time. The memory continues to store the time data of the timing part measured immediately before an engine of the vehicle is stopped. The control part calculates a soak time of the engine from the stored time data and a current time data of the timing part when an engine cranking is completed. The completion of engine cranking may be detected from a rise of rotation speed of the engine to a predetermined speed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
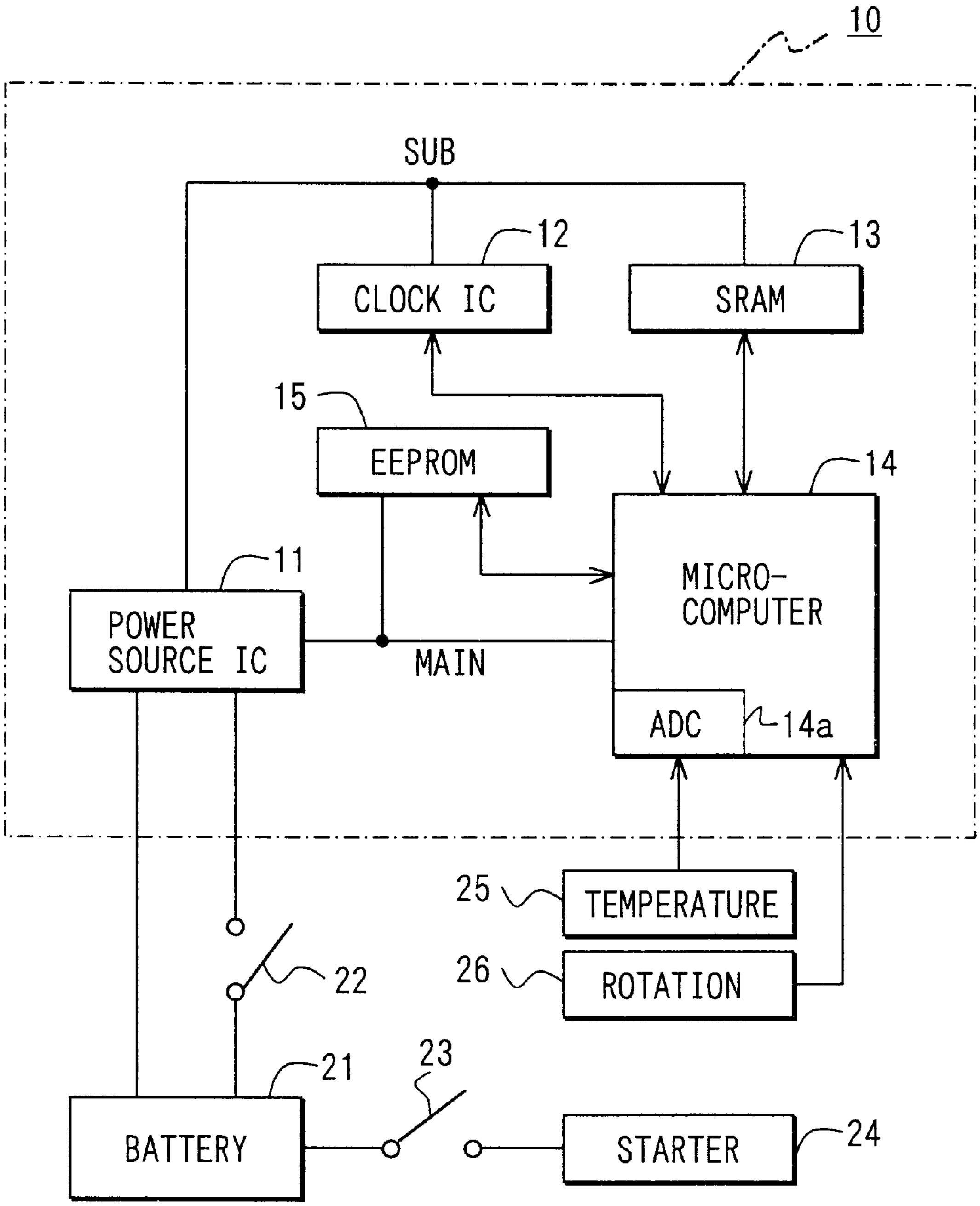
FIG. 1 is a block diagram showing a vehicle electronic control unit for measuring engine soak time according to an embodiment of the present invention.

Referring first to FIG. 1, an electronic control unit (ECU) 10 for a vehicle is connected to a battery 21 by two electrical power supply lines. A power supply IC 11 inside the ECU 10 is supplied with battery power in correspondence with ON/OFF of an ignition (IG) switch 22 by one of the supply lines and is also supplied with battery power at all times by the other supply line. A starter 24 is connected to the battery 21 by way of a starter switch 23 so that the starter 24 is driven with the battery power to crank an engine (not shown).

The power supply IC 11 inside the ECU 10 generates and outputs a main power and a sub power (in this embodiment, both 5 V). The sub power is generated at all times irrespective of the ON/OFF state of the IG switch 22, while the main power is generated only when the IG switch 22 is ON. Of these, the sub power is supplied to a clock IC 12, which constitutes a timing part, and a standby RAM (SRAM) 13. As a result, the clock IC 12 can measure time continuously irrespective of ON/OFF of the IG switch 22. The SRAM 13 can hold stored content thereof even when the IG switch 22 is OFF.

The clock IC 12 divides a clock signal from a quartz crystal oscillator and counts 'years, months, days, hours, minutes, seconds' with a built-in counter. Once a date and time are set, the clock IC 12 continues to operate as long as it continues to be supplied with the sub power, so that accurate time data can be provided by a value inside the clock IC 12.

The main power is supplied to a microcomputer 14 constituting a control part, and an EEPROM 15. The microcomputer 14 comprises a known logical operation circuit made up of a CPU and memory and so on, and executes various calculation and control operations. Further, the microcomputer 14 periodically reads time data of the clock IC 12 and stores this time data in the SRAM 13 as necessary. The microcomputer 14 starts to operate as above when the main power is supplied. That is, the microcomputer 14 operates when the IG switch 22 is turned on, and the microcomputer 14 stops operating when the IG switch 22 is turned off.

A water temperature sensor 25 detects the temperature THW of engine cooling water, and a detection value from the water temperature sensor 25 is read in to an A-D converter (ADC) 14_a_ in the microcomputer 14. The microcomputer 14 determines the engine cooling water temperature THW periodically from the detection value of the water temperature sensor 25. The microcomputer 14 also carries out an abnormality (failure) diagnosis of the water temperature sensor 25. When determining an abnormality of the water temperature sensor 25, the microcomputer 14 stores an abnormality code or the like indicating details of the abnormality in the EEPROM 15.

A rotation sensor 26 generates a rotation pulse every predetermined angular rotation of a crankshaft of the engine and outputs the rotation pulse to the microcomputer 14. The microcomputer 14 calculates a rotation speed Ne of the engine from the rotation pulse.

Figure 2:
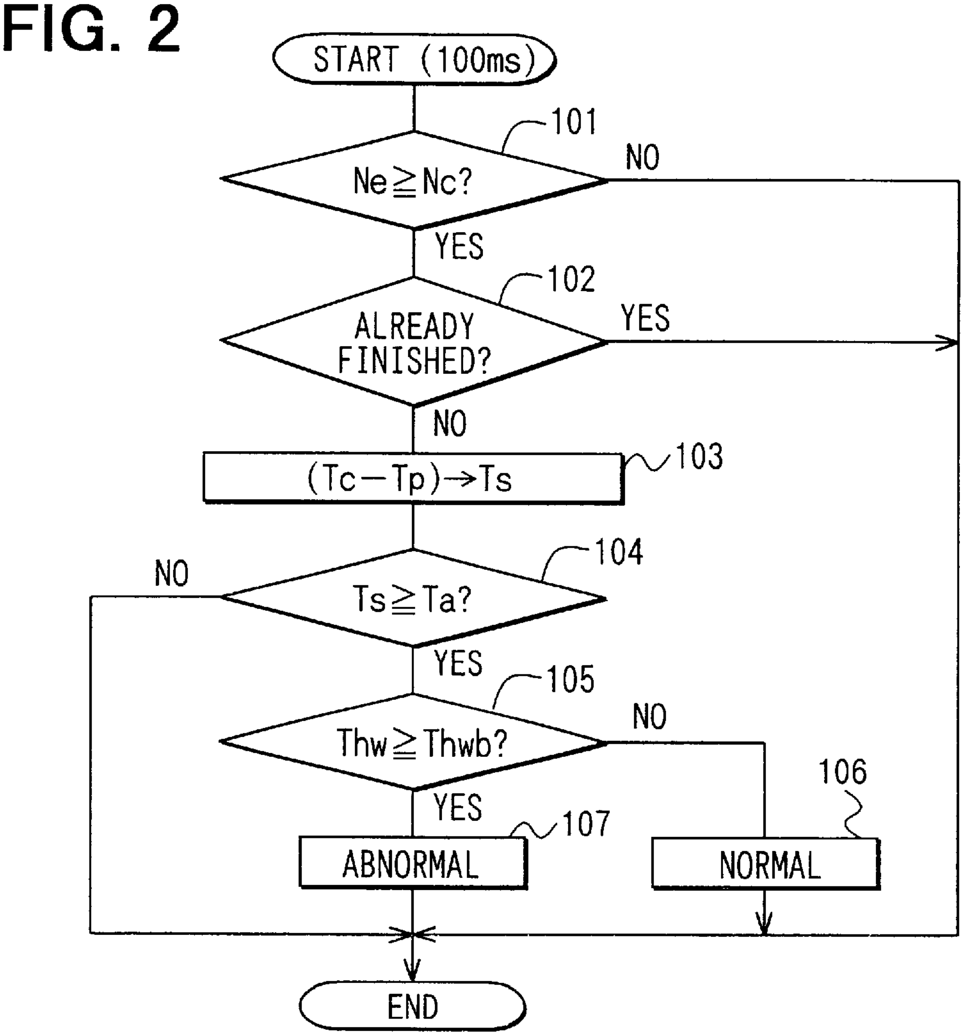
FIG. 2 is a flow chart showing a water temperature sensor abnormality determination routine executed in the embodiment.

The microcomputer 14 is programmed to execute a routine for abnormality determination of the water temperature sensor 25 as shown in FIG. 2. The microcomputer 14 starts this routine every 100 ms, for instance. The microcomputer 14 repeatedly executes this routine when the engine is cranked, and diagnoses the abnormality of the sensor 25 from the drop of the temperature Thw in relation to a soak time Ts in which the engine is held stopped.

Figure 3:
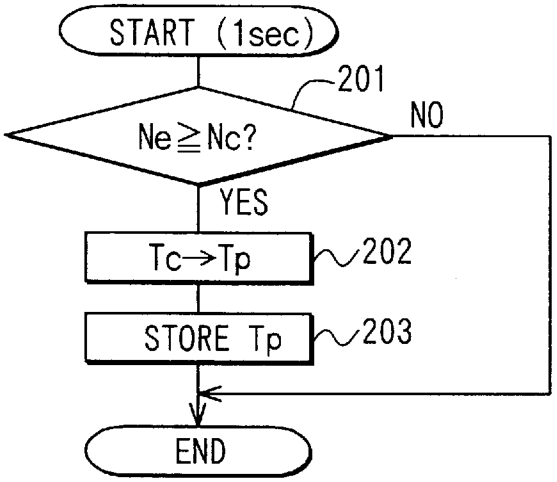
FIG. 3 is a flow chart showing a time measurement interrupt routine executed every second in the embodiment.

Besides the routine of FIG. 2, the microcomputer 14 is programmed to execute a regular interrupt routine shown in FIG. 3 every second. In this routine, it is checked at step 201 whether the engine speed Ne is higher than a predetermined speed Nc (for instance, 800 rpm), that is, whether the engine cranking has been completed. With this check result being YES, at step 202, the current time data Tc of the clock IC 12 (the current time) is made to 'previous time Tp'. At the next step 203, this previous time Tp is stored in the SRAM 13.

Thus, when the engine is running normally, the time data of the clock IC 12 is stored as 'the previous time' in the SRAM 13 every second, so that the time data of the previous time in the SRAM 13 is updated. However, when the engine stops running (IG OFF), the time data of the previous time Tp stored last remains in the SRAM 13, and this data is held even while the engine remains stopped.

When the microcomputer 14 starts to operate with the main power, the routine of FIG. 2 starts. In this routine, it is checked at step 101 whether the engine rotation speed Ne is higher than the predetermined speed Nc. This predetermined speed Nc may be set to a value different from 800 rpm (step 201 in FIG. 3). If the check result is NO indicating that the engine cranking has not been completed, no temperature sensor abnormality determination processing is executed. If the check result is YES indicating the completion of engine cranking, the processing proceeds to step 102.

At step 102, it is checked whether the sensor abnormality determination routine has been finished. If already finished, this routine ends. However, if not yet finished, the processing proceeds to step 103.

At step 103 the current time Tc is read in from the clock IC 12, and at the following step 104 a soak time Ts is calculated using the elapsed time from the previous engine stoppage to the current time Tc. That is, the soak time Ts is calculated from the difference between the current time Tc read in at this moment and the previous time Tp stored when the engine was stopped (the stored SRAM value of step 203, FIG. 3).

After that, at step 104, it is checked whether or not the soak time Ts thus calculated is longer than a predetermined time Ta (for example 6 hours). When the check result is YES, at the following step 105 it is checked whether or not the cooling water temperature (sensor detection value) Thw at that time is above a predetermined temperature THWb (for example 50° C.).

It can be inferred that the water temperature sensor 25 is normal, if the cooling water temperature (sensor detection value) Thw has fallen sufficiently when the predetermined soak time Ts has elapsed. When the check result of step 105 is NO, it is determined at step 106 that the water temperature sensor 25 is normal. When the check result of step 105 is YES, it is determined at step 107 that the water temperature sensor 25 is abnormal. At step 107, a diagnosis code or the like indicating that the water temperature sensor 25 has failed is stored in the EEPROM 15 and a warning light (MIL or the like) for warning that a abnormality has occurred is illuminated.

Figure 4:
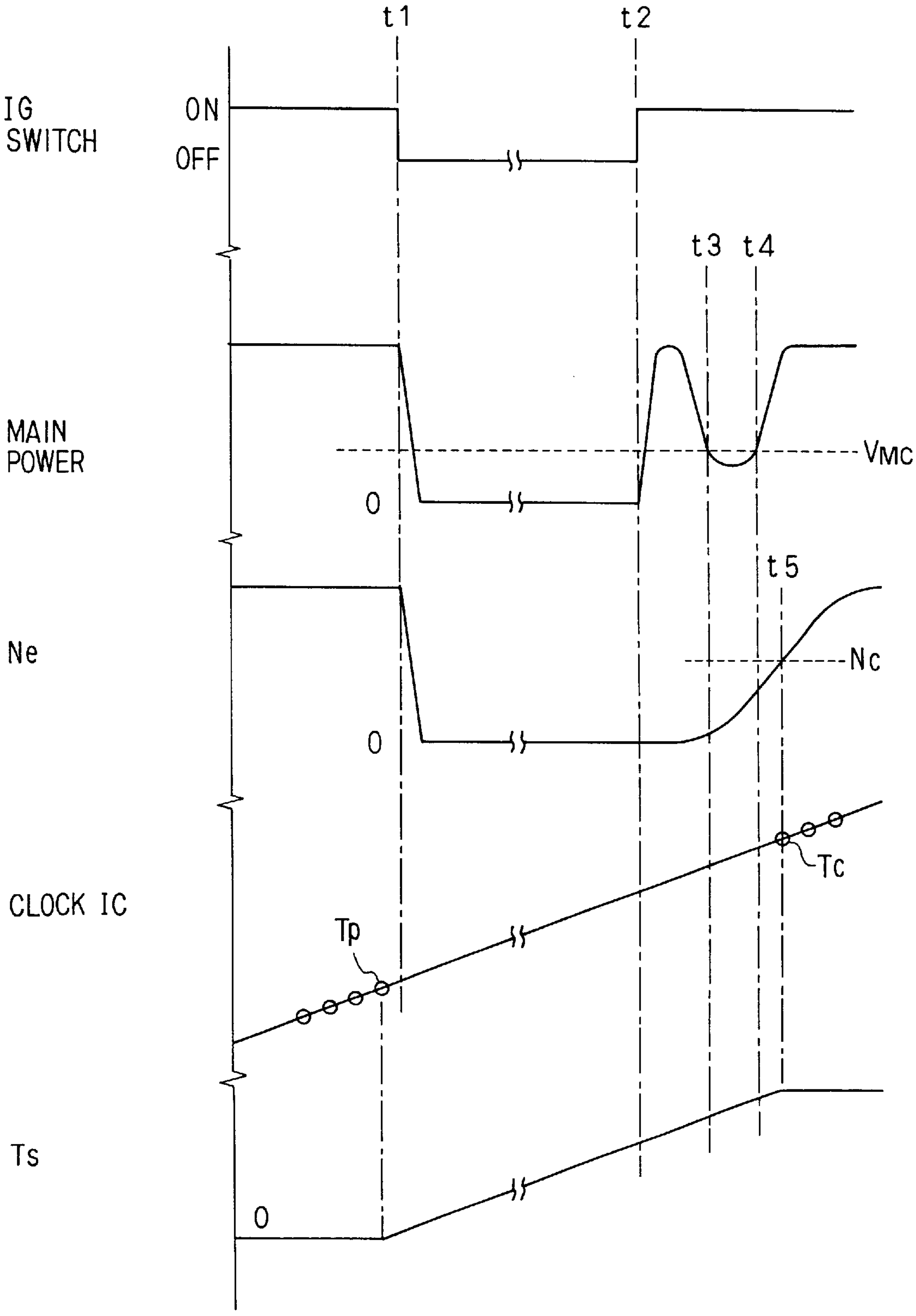
FIG. 4 is a time chart showing engine soak time measuring operation of the embodiment.
Figure 5:
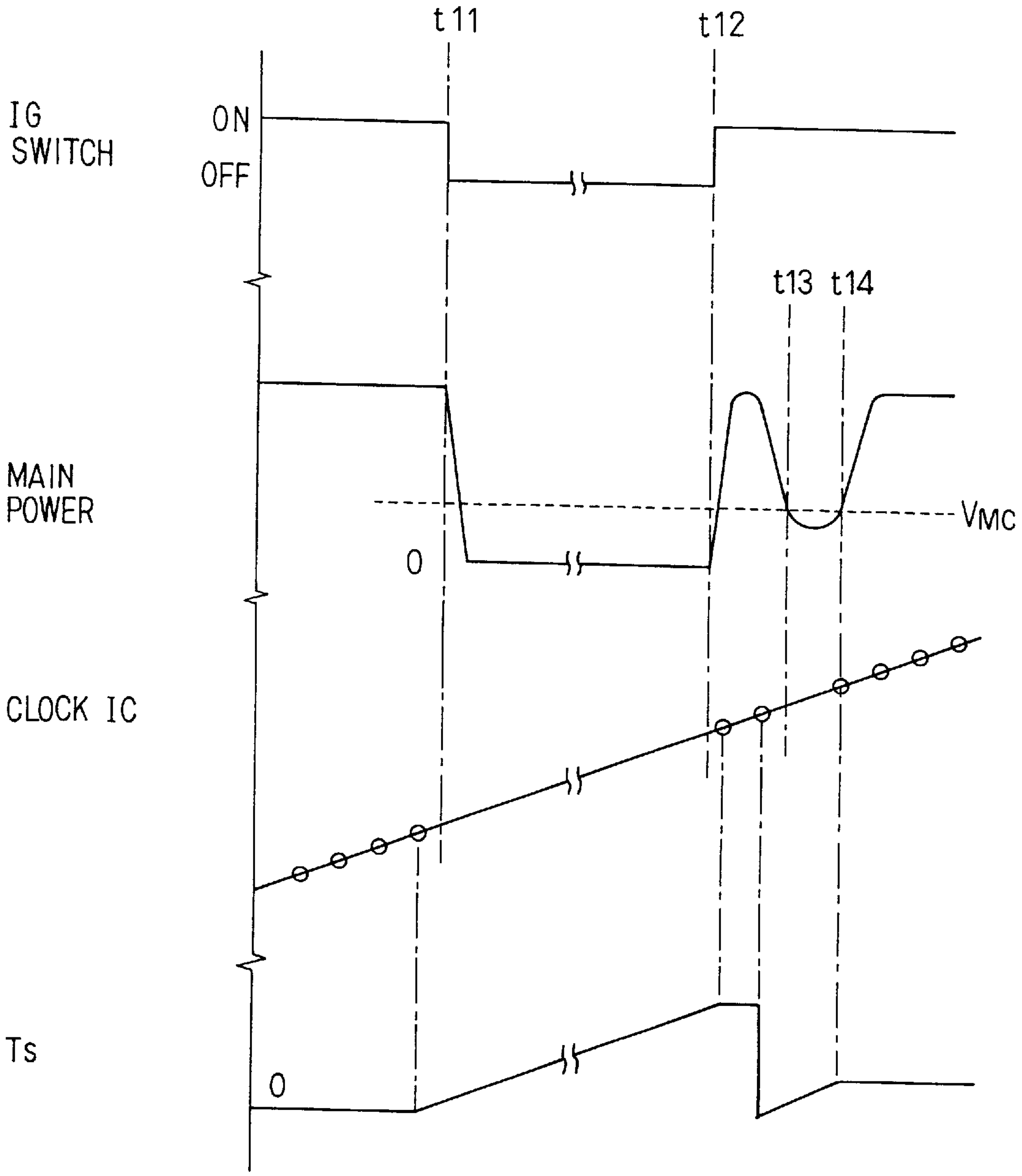
FIG. 5 RELATED ART
FIG. 5 is a flow chart showing engine soak time measuring operation of a related art.

The soak time calculation operation of the microcomputer 14 is shown in detail in FIG. 4.

In the time chart of FIG. 4, while the engine is running (IG switch 22 is ON) before time t1, the time data of the clock IC 12 is read every second and this time data is stored in the SRAM 13 as the previous time Tp. When the IG switch 22 is turned off at time t1, the time data stored in the SRAM 13 is not updated any more and the last time data Tp is held therein.

The clock IC 12 continues to measure time with the supply of sub power even after the engine and the microcomputer 14 stops. The microcomputer 14 is re-started when the IG switch 22 is turned on at time t2. Then the engine is cranked by the starter 24 due to turning on of the starter switch 23. When the engine speed Ne rises above the predetermined speed Nc at time t5 due to the completion of the engine cranking, the current time Tc at this time is read in and the soak time Ts is calculated as Ts=Tc−Tp.

If the temperature Thw detected by the temperature sensor 25 is higher than the predetermined temperature Thwb at time t5 in spite of the soak time Ts being longer than the predetermined time Ta, the temperature sensor 25 is determined to be abnormal and the diagnosis code indicative of this abnormality determination is stored in the EEPROM 15.

In this operation, it may occur that the main power supply to the microcomputer 14 falls due to the battery power supply to the starter 24 for engine cranking and the microcomputer 14 is reset temporarily from time t3 to time t4. However, this voltage drop disappears after the completion of engine cranking (time t5). Therefore, the soak time Ts can be accurately calculated at time t5 without being affected by the temporary resetting of the microcomputer 14.

The battery voltage drop at the engine cranking time affects not only the main power for the microcomputer 14 but also the sub power for the clock IC 12. However, the clock IC 12 is operable with about 2 V, while the microcomputer 14 is operable with about 5 V. Therefore, the clock IC 12 is operable to continue to measure time unless the battery voltage falls below 2 V.

As the soak time Ts is calculated only after the completion of engine cranking which follows re-starting of the microcomputer 14 as described above, the soak time calculation is not affected by the battery voltage drop which occurs at engine cranking time. Thus, the sensor abnormality determination routine can be carried out accurately.

It may also occur that the starter switch 23 is not turned on after the IG switch 22 is turned on. In this instance, the soak time Ts is not calculated until the engine cranking has been completed. Thus, the calculated soak time accurately represents the actual engine stop period.

The present embodiment may be modified in various ways. For instance, the completion of engine cranking may be detected based on the operation of the starter switch 23, that is, based on a change of the starter switch 23 from NO to OFF. Further, it may be detected based on an alternator rotation speed, alternator-generated voltage, turbine rotation speed of an automatic transmission, and/or engine intake air amount (pressure). The calculated soak time may be used to determine the rate of activation of an engine exhaust purifying catalyst at the time of engine cranking, because the catalyst temperature and hence the rate of activation of catalyst changes with the soak time. The soak time may be calculated from time data provided by an external clock.

The present invention should not be limited to the disclosed embodiment and modifications, but may be implemented in other ways without departing from the spirit of the invention.

What is claimed is:

1. An electronic control unit for a vehicle having an engine, the electronic control unit comprising:

a control part which operates and stops in accordance with state of a power supply voltage switched by a power supply switch;

a timing part which operates with the power supply voltage and measures time continuously irrespective of whether the control part is operating or stopped; and a memory which stores measured time;

wherein the memory continues to store a time data of the timing part measured immediately before the engine is stopped, and wherein the control part calculates a soak time of the engine from the stored time data and a current time data of the timing part when an engine cranking is completed.

2. The electronic control unit according to claim 1, wherein:

the control part detects completion of engine cranking from a rise of rotation speed of the engine to a predetermined speed.

3. The electronic control unit according to claim 1, wherein:

the control part continues to read in the time data of the timing part at every predetermined interval and updates the stored time data as long as the power supply voltage is applied thereto.

4. The electronic control unit according to claim 1, further comprising:

a water temperature sensor for detecting the temperature of cooling water of a vehicle engine, wherein the control part determines abnormality of the temperature sensor from the calculated soak time and a detection value of the water temperature sensor.

5. A method of measuring soak time of an engine of a vehicle having a battery, a clock, a microcomputer, a memory and a starter, the method comprising the steps of:

continuously measuring time at every predetermined time by the clock supplied with electric power from the battery irrespective of operation of the engine;

storing and updating the measured time in the memory as long as the engine is in operation, and holding last-updated time by the memory when the engine stops operation;

supplying the electric power to the microcomputer before engine cranking by the starter;

detecting by the microcomputer a completion of engine cranking by the starter;

calculating soak time of the engine by the microcomputer using the last-updated time and latest time measured by the clock upon detection of the completion of engine cranking; and using the calculated soak time to check operation condition of equipment of the engine.

* * * * *